Figure 1:
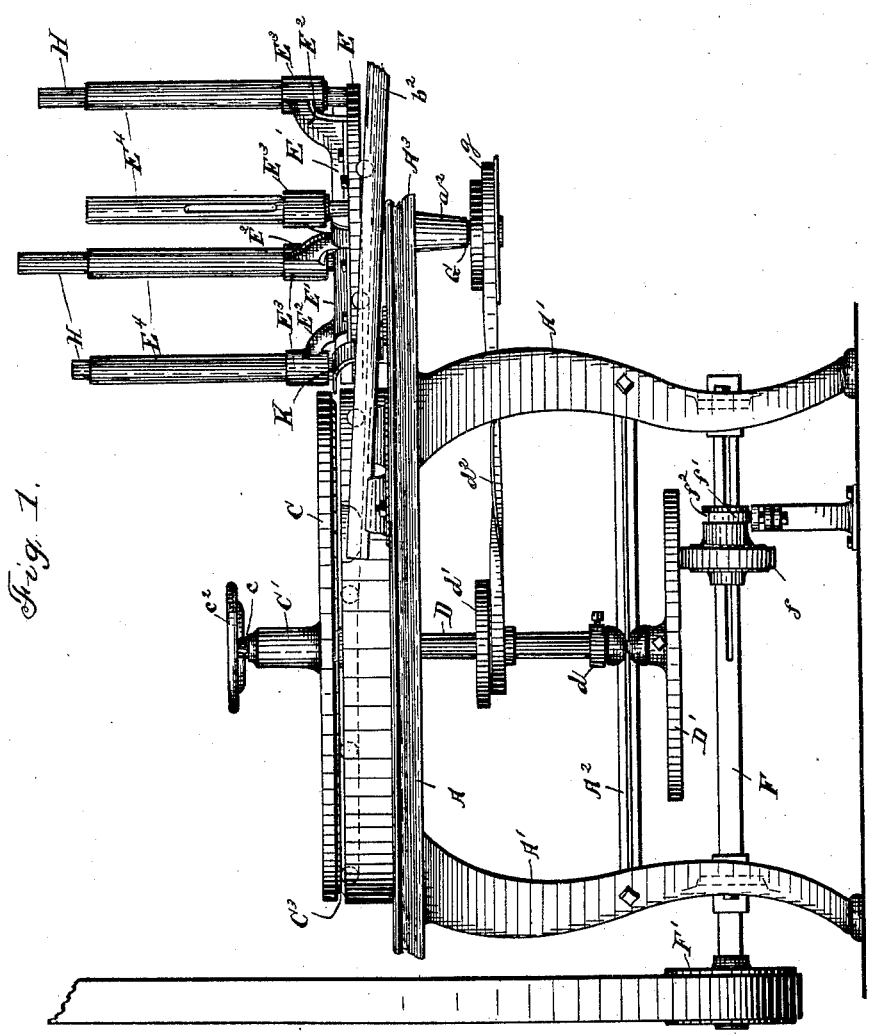

(No Model.) 3 Sheets—Sheet 1.
A. L. DYKE.
MACHINE FOR MANUFACTURING MARBLES.

No. 431,454. Patented July 1, 1890.

Witnesses
W. R. Edelen.

Inventor
Actaeon L. Dyke.
By Attorneys
Leggett & Leggett (No Model.) 3 Sheets—Sheet 2.
A. L. DYKE.
MACHINE FOR MANUFACTURING MARBLES.
No. 431,454. Patented July 1, 1890.
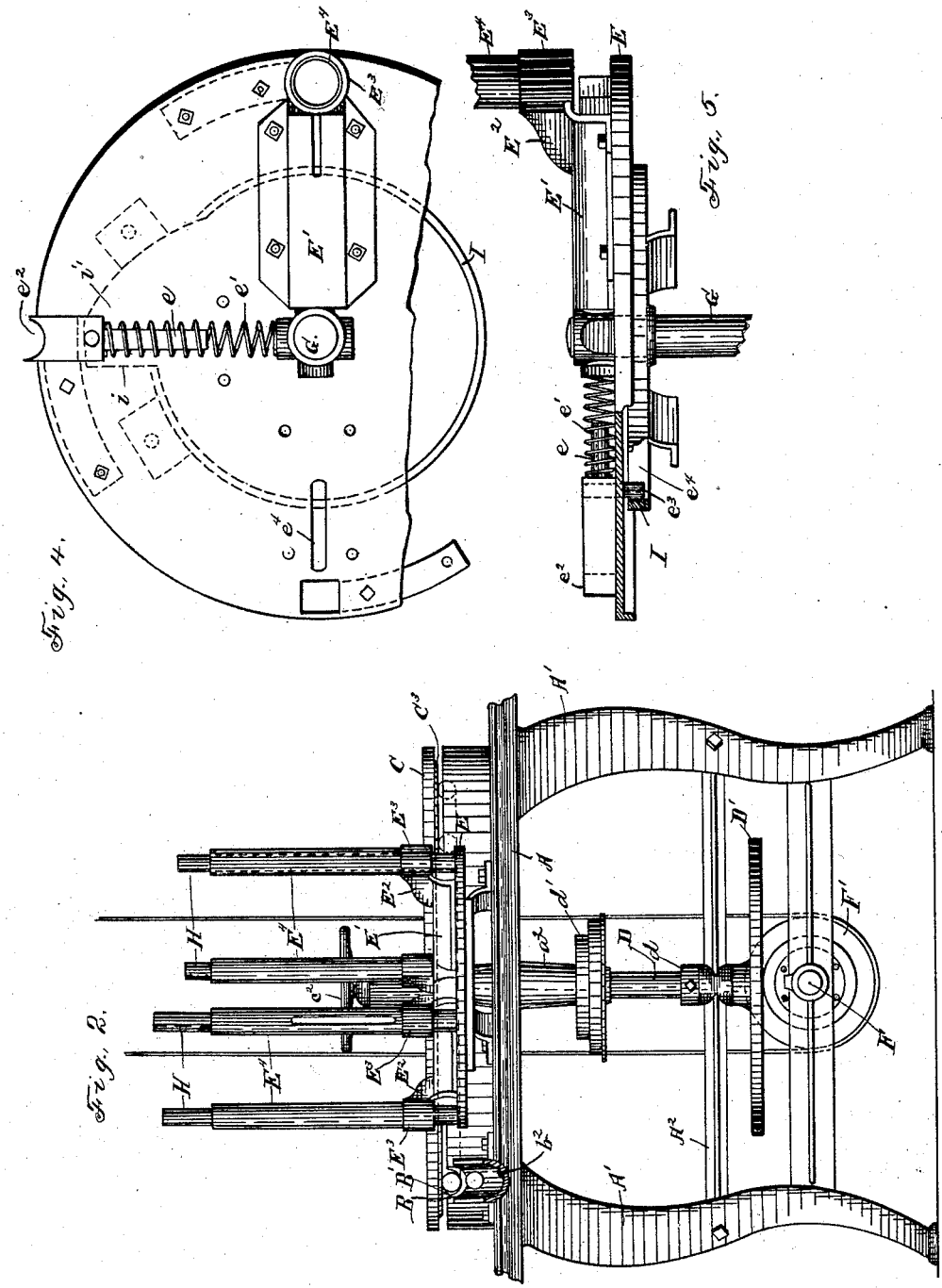
Witnesses
W. R. Edelen
Inventor
Actaeon L. Dyke
By Attorneys
Leggett & Leggett

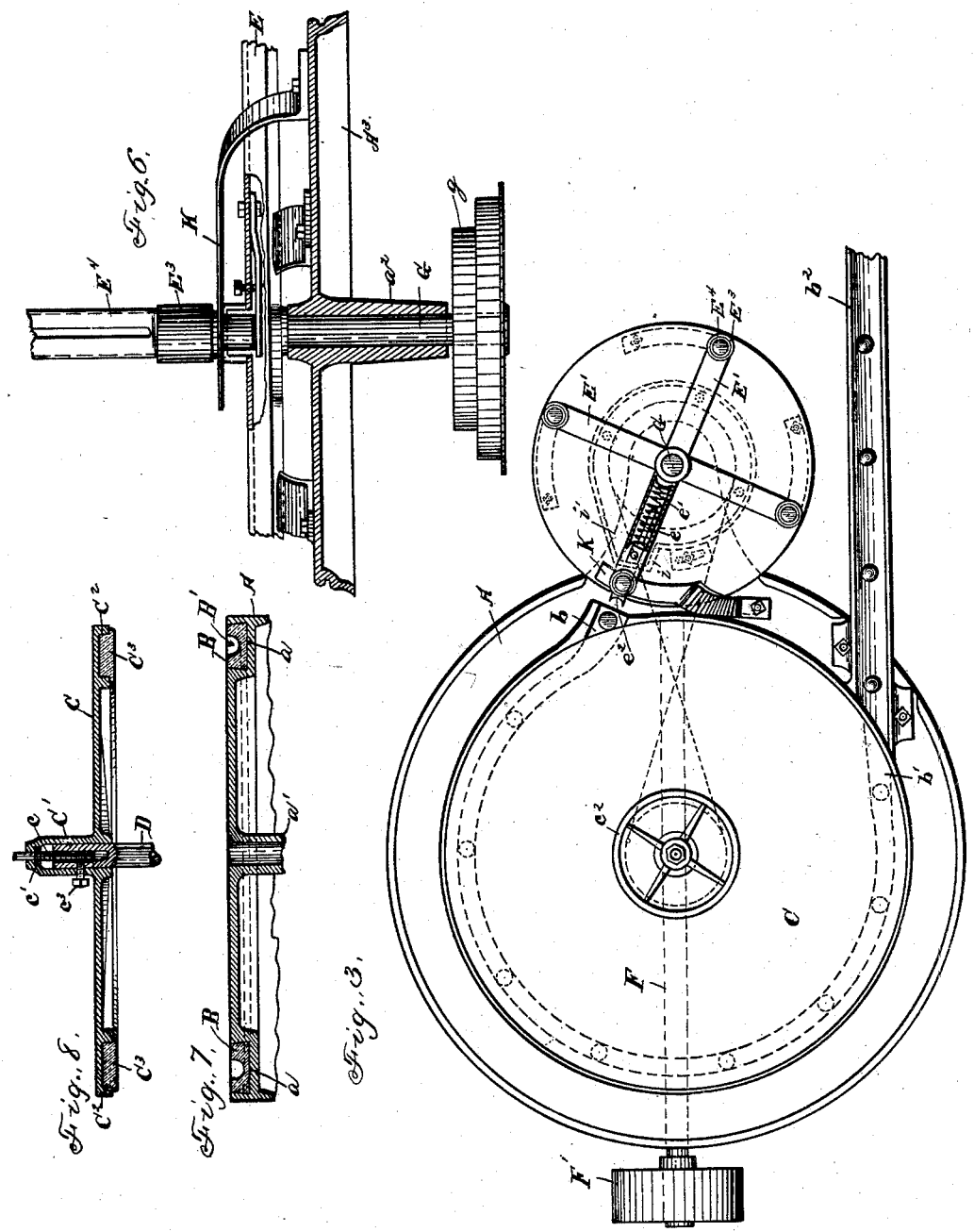

UNITED STATES PATENT OFFICE.

ACTAEON L. DYKE, OF AKRON, OHIO.

MACHINE FOR MANUFACTURING MARBLES.

SPECIFICATION forming part of Letters Patent No. 431,454, dated July 1, 1890.

Application filed March 13, 1890. Serial No. 343,745. (No model.)

*To all whom it may concern:*

Be it known that I, ACTAEON L. DYKE, of Akron, in the county of Summit and State of Ohio, have invented certain new and useful Improvements in Machines for Manufacturing Marbles; and I do hereby declare the following to be a full, clear, and exact description of the invention, such as will enable others skilled in the art to which it pertains to make and use the same.

My invention relates to improvements in machine for manufacturing marbles; and it consists in certain features of construction and in combination of parts hereinafter described, and pointed out in the claims.

Heretofore marbles have usually been shaped approximately spherical by rolling the clay between the palms of the hands. This work was slow and expensive and the marbles were not very accurate in form. I have therefore devised a machine for doing this work, the same being illustrated in the accompanying drawings.

Figures 1 and 2 are respectively side and end elevations. Fig. 3 is a plan. Figs. 4, 5, and 6 are respectively enlarged plan and elevation in detail of the feed mechanism, portions being removed or broken away or sectioned to show the construction. Figs. 7 and 8 are corresponding elevations in section of a table and an opposing rotating disk for reducing the blanks of clay to a spherical form.

A represents a table or supporting-bed mounted on legs A', the upper surface of the table having an annular recess $a$, into which is cast a matrix B of suitable material that will not stick to the clay—such, for instance, as plaster-of-paris, so-called "white-metal," &c. This matrix has an annular groove B', adapted to co-operate with the rotating disk above in shaping the marbles. The table and matrix are provided at $b$ and $b'$ with tangential induction and eduction grooves leading to and from groove B', groove $b'$ connecting with the discharging-trough $b^2$.

C is a revolving disk mounted on the upright spindle D, the spindle above being journaled in hub $a'$ of the table, and is journaled below in a box connected with crossbar A² of the table-legs. The spindle next above the lower journal-box is provided with a collar $d$ for supporting the spindle. Disk C is provided with an upwardly-projecting hub C' of considerable length, the hub being bored from the bottom to near the upper end thereof to receive spindle D with an easy fit. The top end wall of this hub is provided with an adjusting-screw $c$, that engages a screw-threaded hole in the upper end of the spindle. This screw is provided with a collar $c'$ inside the hub, and is provided outside the hub with a hand-wheel $c^2$ for operating the screw, whereby disk C may be adjusted vertically. Hub C' is provided with a set-screw $c^3$, that is tightened upon the spindles after such adjustment, because the disk will rotate with the spindle. The under face of disk C is provided with an annular recess C² for receiving a pad or cushion C³. This pad or cushion may be constructed of various materials—such, for instance, as comparatively soft rubber. A pad constructed of several layers of canton-flannel will answer the purpose well. This cushion or pad is located opposite matrix B.

On the lower end of spindle D is mounted a friction-disk D', that is engaged by a friction-wheel $f$, mounted on the driving-shaft F, the latter being provided with driving-pulley F'. Shaft F and the friction-wheel are provided with the well-known device of groove and spline, whereby wheel F may be adjusted along the shaft toward and from the center of disk D' to regulate the speed of the machine. The hub of wheel $f$ is provided with an annular groove $f'$, that is engaged by the prongs of a forked lever $f^2$. When the speed of the machine has once been adjusted, the forked arm may be permanently fastened to the floor or other support.

A preferable construction of feed mechanism is as follows: Spindle D is provided with a cone-pulley $d'$, that is connected by means of a cross-belt $d^2$ with cone-pulley $g$ of the upright spindle G, this spindle being journaled in box $a^2$ of section A³ of the supporting cable or bed. On spindle G, and located above member A³ of the table, is mounted the rotating feed-disk E, the top surface of this disk being about flush with the bottom of groove $b$ aforesaid. Disk E is provided with a series of channel-bars E', of which there may be any desired number in the series, these channel-bars occupying radial positions on the disk to which they are fastened equidistant apart, and with the channeled or recessed faces thereof next the disk. The outer ends of these channel-bars terminate in goose-necks E², and the latter terminate in hollow hubs E³ for supporting, respectively, tubes E⁴. These hubs are usually screw-threaded internally for engaging the lower screw-threaded sections of the tubes, whereby the tubes are not only supported, but the tubes may be adjusted a limited distance vertically. In these vertical tubes are placed compact cylindrical bars H of clay, these bars of clay fitting easily inside the tubes, so that they may descend by gravity and rest on the disk E. Channel-bars E′ serve as housings and guides, respectively, for the spring-actuated push-bars $e$, the springs $e'$ thereof acting outward on the push-bars. The outer ends of the push-bars are concaved, as shown at $e^2$, to approximately fit the bars of clay. Each push-bar is provided with a depending pin $e^3$, these pins operating in and extending through radial grooves $e^4$ of the feed-disk. These pins project some little distance below the disk for engaging cam-ring or flange I. This cam-ring may be attached to member A³ of the table, or it may consist of an upwardly-projecting flange integral with this section of the table. This cam-ring in the main is concentric with spindle G, but about opposite groove $b$ the cam-ring is offset outward at $i$, and from thence to its union with the eccentric portion thereof is cam-shaped, as shown at $i'$. Pins $e^3$ engage the inner face of the cam-ring, and are thereby held inward against the action of springs $e'$ while the pins are traveling along the concentric portion of the ring, whereby the push-bars are held in position with the concaved end thereof just inside the bars of clay.

K is a knife for severing the bars of clay as they are moved past it. The shank of the knife is fastened to the table, and the shank is offset upward, so that the knife-blade extends some little distance above disk E and approximately in the position shown in Fig. 3. As the different tubes E⁴ sweep past the line of and over the knife, the different bars of clay held by the different tubes are successively severed, the knife being adjusted at such distance above disk E that just enough clay is cut off from each bar to make a marble, and as the knife is stationary and as the bars of clay are supposed to be of uniform size it is evident that the severed blanks will be uniform in size. Just as a blank is severed pin $e^3$ of the opposing push-bar reaches the offset in the cam-ring, whereupon the recoil of the spring of the push-bar thrusts the latter outward, and thereby thrusts the blank of clay into groove $b$ and under the edge of disk C. Immediately after pin $e^3$ engages section $i'$ of the cam-ring, and is thereby snubbed back, whereby the push-bar is reversed, so that it is out of the way of the opposing bar of clay, the latter may fall by gravity just outside the push-bar and again rest upon disk E. Meantime the action of disk C on the blank tumbles the latter along groove $b$ into groove B′. Groove B′ is not intended to fit the ball of clay, but only to confine it within limited bounds, and the combined action of the grooved matrix and disk C on the clay is much the same as had in rolling the clay between the palms of the hands, as marbles have heretofore been shaped by hand, except that the machine does its work much better and the completed marbles are more perfect in form than hand-made marbles. The discharging-groove $b'$ is a little inclined and is a little deeper than groove B′; hence as the finished balls reach groove $b'$ they readily roll out into trough $b^2$ and are discharged from the machine. The balls of clay in traveling along groove B′ need not be separated the one from the other but a short distance, and hence feed-disk E may be provided with as many push-bars and co-operating devices as can practically be mounted on this disk, more or less in number, according to the size of the disk.

The machine is comparatively inexpensive, but requires somewhat careful adjustment of parts. Therefore I consider it better practice to provide different machines for the different-sized marbles rather than to adjust one machine for different sizes, more especially as different matrices, push-bars, and tubes would have to be provided, and a marble-factory of any pretensions would likely require more machines than there are different standard sizes of marbles.

In operating the machine the proper speed of disk C can only be determined by experiment. With a slow movement of this disk the balls of clay are inclined to hug the inner wall of groove $b'$. If the disk is speeded too fast, the balls of clay will crowd against the outer walls of the groove. A little practice will determine the proper speed of the disk, and when this is attained arm $f^2$ may be permanently secured to the floor or other support. Disk E, by means of the cone-pulleys, may be run at such speed as found most practicable. The balls of clay discharged from the machines may be glazed and baked substantially like pottery.

In constructing the machine various modifications may be made without departing from the spirit and purpose of my invention. For instance, the matrix and disk C may be inverted. This would require some modification of table or bed to adapt it to support the matrix above the disk, but the result in shaping the balls would be the same, and there is not much choice in the two constructions. However, for various reasons, I prefer the construction shown; also, the matrix might be attached to and made to revolve with disk C, in which case the pad would be transferred to the table. Such construction would require considerable modification in the feed mechanism, but so far as shaping the balls of clay is concerned the result would be the same as with the construction shown.

What I claim is—

1. In a machine for manfacturing marbles, in combination, a supporting table or bed and an opposing rotating disk, the one bearing a matrix having a concentric groove and the other having a padded or cushioned surface opposite the annular groove, such annular groove and padded surface being arranged concentric with the axis of the disk, substantially as set forth.

2. In combination, a supporting-table and an opposing revolving disk, the table having a matrix provided with an annular groove concentric with the disk and provided with induction and eduction grooves connecting with the annular groove, the disk having a padded surface opposite the annular groove of the matrix, substantially as set forth.

3. In combination with a matrix having an annular groove and having tangential grooves to and from such annular groove, an opposing disk having a yielding surface opposite and concentric with the annular groove and means for rotating the disk and for adjusting the disk toward and from the matrix, substantially as set forth.

4. The combination, with grooved matrix and opposing rotating disk, substantially as indicated, of a rotating feed-disk bearing one or more upright tubes adapted to hold bars of clay, a stationary knife adapted to successively engage and sever the bars of clay, spring-actuated push-bars mounted on the feed-disk and adapted to thrust opposing blanks into the feed-groove of the matrix, and a cam-ring for reversing and releasing the push-bars, the parts being timed to co-operate, substantially as set forth.

In testimony whereof I sign this specification, in the presence of two witnesses, this 19th day of February, 1890.

ACTAEON L. DYKE.

Witnesses:
C. H. DORER,
WILL B. SAGE.